United States Patent [19]

Todome

[11] Patent Number: 4,896,223

[45] Date of Patent: Jan. 23, 1990

[54] DISPLAY AND INPUT DEVICE

[75] Inventor: Tuyoshi Todome, Tokyo, Japan

[73] Assignee: Kabushiki Kaisha Toshiba, Kanagawa, Japan

[21] Appl. No.: 170,254

[22] Filed: Mar. 18, 1988

[30] Foreign Application Priority Data

Mar. 19, 1987 [JP] Japan .................................. 62-66967

[51] Int. Cl.[4] ............................................... H04N 1/32

[52] U.S. Cl. .................................... 358/468; 358/444; 340/712

[58] Field of Search ............... 358/256, 257, 280, 286, 358/468, 444; 340/712

[56] References Cited

U.S. PATENT DOCUMENTS

| | | | |
|---|---|---|---|
| 4,648,062 | 3/1987 | Johnson | 340/712 |
| 4,774,590 | 9/1988 | Haganuma | 358/280 |
| 4,803,463 | 2/1989 | Sado | 340/712 |
| 4,804,950 | 2/1989 | Moon | 340/712 |

OTHER PUBLICATIONS

Japanese Patent Application No. 61—126643, by Kunihiro Shibuya and Tuyoshi Todome.

*Primary Examiner*—Howard Britton

*Attorney, Agent, or Firm*—Finnegan, Henderson, Farabow, Garrett and Dunner

[57] ABSTRACT

This invention is a display and input device, which is used in combined equipment incorporating a number of equipment (for example, a copier, a facsimile machine, a printer or a scanner) having independent operational functions. This display and input device comprises a transparent touch panel having a flat display and is designed so that the picture image information is displayed step by step by the display unit. When a device which incorporates a number of types of equipment having independent operational functions is operated and the picture image information is executed, the display unit changes to display a number of display modes in a certain operating mode according to the input operation for this input unit. Since, at this time, the inputted operation information for the display mode prior to the change is displayed in the display mode after the change, such as pre-operational inputted information display in a message field, the operator of the device can execute an input operation while checking the information he has already inputted. The checking of this information is simple and the operation can be correctly executed.

4 Claims, 8 Drawing Sheets

DISPLAY AND INPUT DEVICE

BACKGROUND OF THE INVENTION

1. Field of the Invention

This invention relates to a display and input device, and, more precisely, to a combined display and input device used for equipment incorporating a number of independant functions, such as copiers and facsimile machines.

2. Discussion of Background

Conventional electronic equipment processing picture image information for various purposes, such as copiers and printers, are assembled and used as discrete and independent single devices. However, with current advances in technology, combined equipment which incorporates these multiple functions is now coming into practical use.

However, most of the conventional combined display and input devices (control panels) used to operate various modes, such as the copy mode and the facsimile mode, in this kind of combined equipment are button-key systems which have rows of input keys that differ in purpose for each operating mode of the combined equipment. Also, most of the conventional displays are designed to display the required input operation information for the operation by switching ON and OFF a multiplicity of LEDS.

For this reason, when using this conventional equipment, in the copy mode, for instance, the inputted operation information for copy magnification and the number of copies is not displayed on the face of the control panel. Thus, the operator of this equipment has to carry out the required input operation for this input operation information from memory.

Such equipment causes problems such as not obtaining the copy picture images of the desired magnification, or not obtaining the desired number of copy picture images due to operator error. When such problems occur, the input operation must be restarted.

This kind of problem occurs, not only in the copy mode, but also in other operations, such as in the printer mode and the like which accompany the magnification alteration operation.

As described above, in prior art equipment, there was a problem of not being able to achieve effective application of the equipment, that is, the operation could not check the inputted operation information when carrying out a complex input operation, and re-input operations where required.

SUMMARY OF THE INVENTION

The object of this invention is to provide a display and input device which can check the inputted operation information even in cases when the operating mode has changed and which, thus, can make more efficient use of this device.

This invention is a display and input device incorporating a display unit and an input unit, which is used in combined equipment incorporating a number of equipments having independent functions. This is display and input device has the characteristic of being designed so that the display unit has a number of display modes which vary according to the input operation for the device, and when the display mode has changed, the operation information inputted prior to the change in the display mode is displayed by the display unit after the change.

The following is an explanation of the operation of a device with the above construction. When a combined equipment which incorporates a number of equipments having independent operation functions for picture image information is operated, the input unit in the combined display and input device used in this combined equipment can be operated while looking at the information displayed on the display unit. The display unit changes to display a number of display modes in a certain operating mode according to the input operation for this input unit. Since, at this time, the inputted operation information for the display mode prior to the change is displayed in the display mode after the change, the operator of the device can execute an input operation while checking the information he has already inputted.

DETAILED DESCRIPTION OF THE PREFERRED EMBODIMENT

Figure 1:
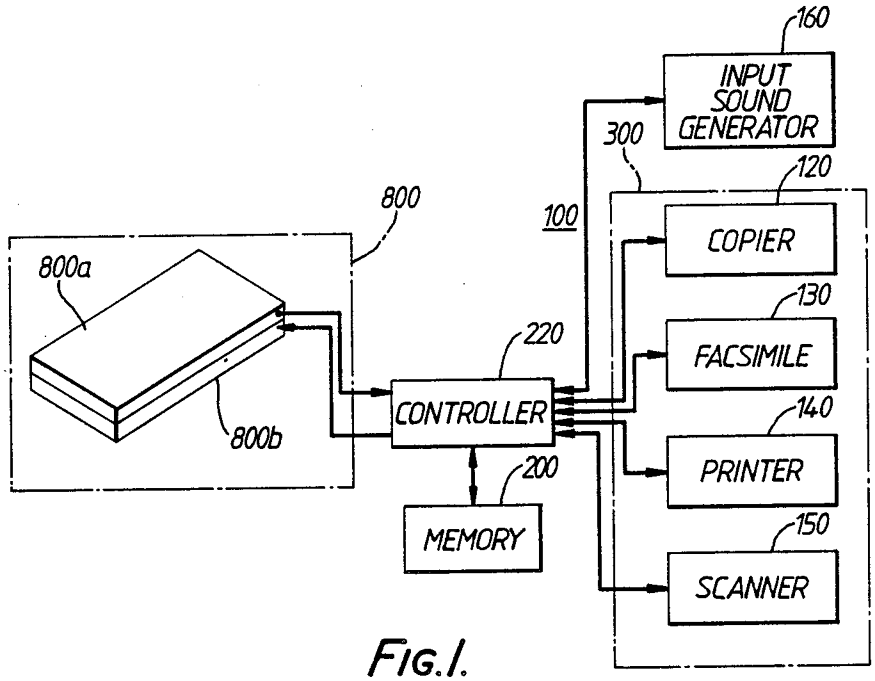
FIG. 1 is a block diagram showing the construction of the combined equipment which includes a first preferred embodiment of the present invention.

A first embodiment of a display and input device according to the present invention will now be described with reference to the accompanying drawings. Combined equipment 100 used in a first preferred embodiment of the present invention shown in FIG. 1 includes a combined display and input device 800, which is composed of and incorporates transparent touch panel 800*a*. Transparent touch panel 800*a* is a rectangular input unit: combined equipment 100 also includes flat display 800*b*, which is a display unit facing transparent touch panel 800*a*; a combined function unit 300; a memory 200 in which are pre-stored the control program for displaying the display areas and input areas for the various modes in combined display and input device 800 and the operation program which carries out operational control of combined function unit 300; and a controller 220 which loads the control programs from memory 200 and acts as a control device for setting the key input areas for transparent touch panel 800*a* and transmitting the key input signals and, at the same time, for executing the various displays (described below) for flat display 800*b*.

Transparent touch panel 800*a* is composed of any of various detection systems, such as an optical system, a transparent conductive film (resistor film) system, a capacitance system or a pressure system. As described below, transparent touch panel 800*a* is designed to transmit touches of an operator's fingers to controller 220 as key input signals.

Flat display 800*b* is composed of flat displays, such as a liquid crystal display (LCD), a plasma display (PDP), a light-emitting diode (LED) display, an electroluminescent display (ELD), an electrostatic memory projection type display (ECD), and CRT display.

Combined function unit 300 comprises four types of equipment: a copier 120, a facsimile 130, a printer 140 and a scanner 150.

Moreover, combined equipment 100 has input sound generator unit 160, composed of a buzzer, a chime and an electro-synthetic sound generator, which generates any audible sound such as a buzzer sound, a chime sound or an electro-synthetic sound.

Figure 2:
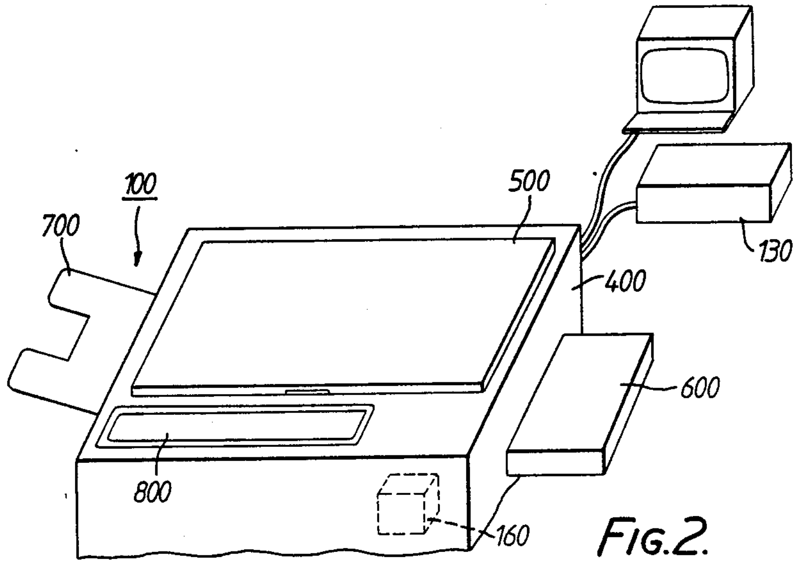
FIG. 2 is an oblique cut-away view of the essential part showing the combined equipment shown in FIG. 1.

As shown in FIG. 2, controller 220, combined function unit 300 and memory 200 are housed in cabinet 400. Combined display and input device 800 is installed at one corner of cabinet 400 in combined form, with transparent touch panel 800*a* on top and flat display 800*b* below.

In FIG. 2, cabinet 400 also comprises a cover 500, a paper supply cassette 600 and a paper dispense tray 700.

Next, the operation of combined equipment 100 will be described, with a focus mainly on the various display modes in combined display and input device 800 and the setting modes of the key input positions which correspond to these display modes.

Figure 3:
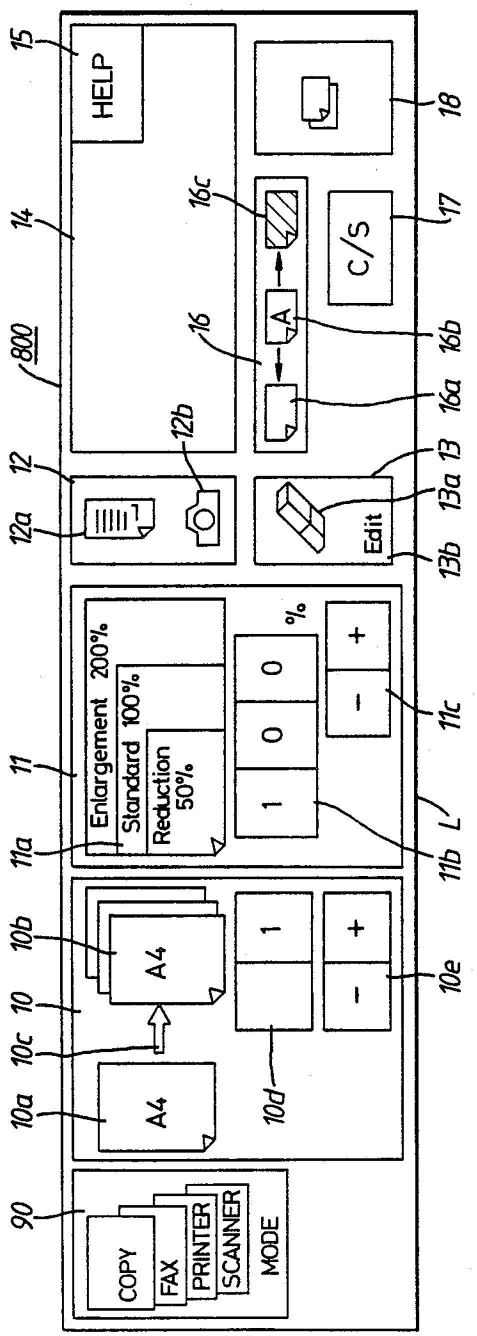
FIG. 3 is a plan view showing a display for the Copy Mode in the first preferred embodiment.
Figure 4:
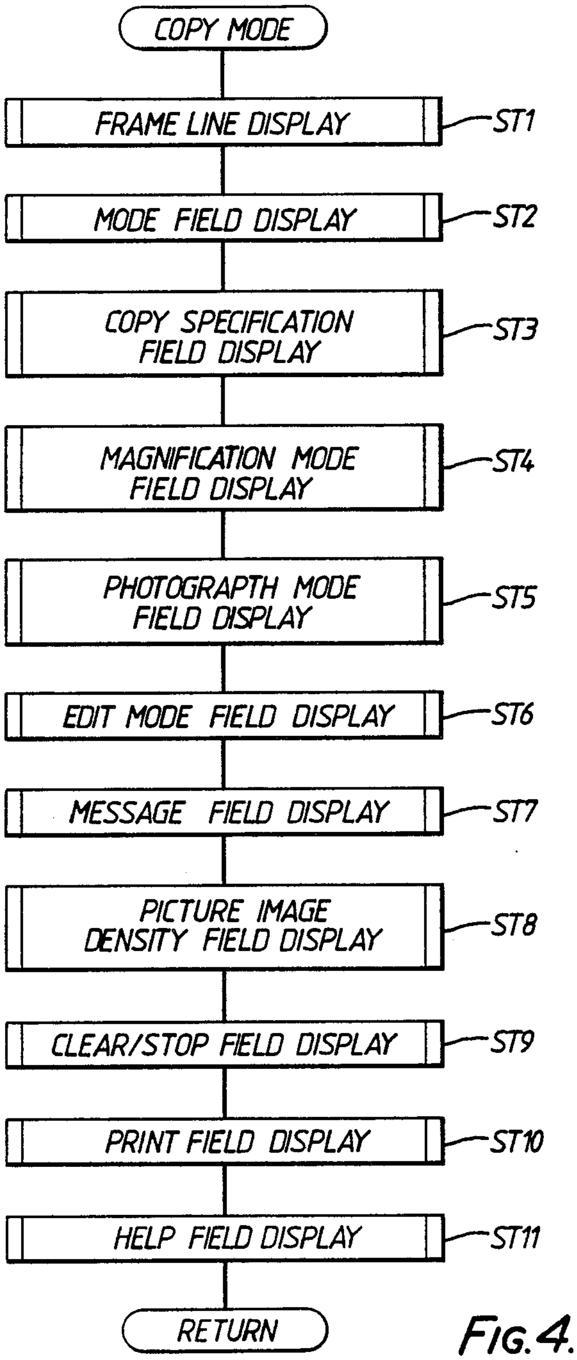
FIG. 4 is a flow chart showing the display content in the Copy Mode of the first preferred embodiment.

When combined equipment 100 is started, controller 220 loads the initial mode control program which is stored in memory 200. For example, if combined equipment 100 is set with the Copy Mode (COPY) as the initial mode, the content of the control program shown in FIG. 4 is loaded and, on the basis of this, display signals are sent to flat display 800*b*, and the display information and key input positions for the Copy Mode (COPY) are displayed in the display mode as shown in FIG. 3.

That is to say, first, frame line L is displayed on flat display 800*b* (ST1), and then Mode field 90 is displayed in the left corner of frame line L (ST2). Mode field 90 contains the word MODE and four rectangular frames, which are superimposed but slightly shifted in relation to each other. In these superimposed frames, characters indicating copy (COPY), facsimile (FAX), printer (PRINTER) and scanner (SCANNER) are displayed in that order, starting from the top. Also, controller 220 sets a touch area, i.e., an area which, when touched with a finger, causes an electrical signal to be generated, for the whole area of Mode field 90.

Next, controller 220 displays Copy Specification field 10 immediately to the right of Mode field 90 (ST3). The following items are displayed in Copy Specification field 10, as shown in FIG. 3: Original Document Size 10*a* in the upper left-hand side (for example, the characters A4); Copy Paper Size 10*b*, on the upper right-hand side; arrow sign 10*c* between Original Document Size 10*a* and Copy Paper Size 10*b* and Number of Copies display section 10*d* below Copy Paper Size 10*b*.

Input keys 10*e* for the number of copies are also displayed as, for instance, plus (+) for increasing the number of copies and minus (−) for decreasing the number of copies, beneath Number of Copies display section 10*d*. Both keys are approximately 5×5 mm.

Controller 220 also displays Magnification Mode field 11 immediately to the right of Copy Specification field 10 (ST4).

In Magnification Mode field 11 are respectively displayed; Picture Image Magnification display section 11*a* at the top, Magnification Number display section 11*b* in the center and Magnification input keys 11*c* at the bottom.

Picture Image Magnification display section 11*a* displays three superimposed paper graphics for reduction (Reduction, for example, 50%), standard (Standard: 100%) and enlargement (Enlargement: for example, 200%).

Next, controller 220 displays Photograph Mode field 12 positioned above with Edit Mode field 13 below, immediately to the right of Magnification Mode field 11 (ST5, ST6).

In Photograph Mode field 12, Document 12*a* and Camera 12*b* are displayed (ST105). Also, in Edit Mode field 13, mark 13*a* and the characters for edit (EDIT) 13*b* are displayed.

Also, controller 220 displays Message field 14 and Picture Image Density field 16 immediately to the right of Photograph Mode field 12 and Edit Mode field 13.

Message field 14 is a rectangular shape designed to be displayed in the top right-hand corner of flat display 800*b* (ST7, ST8)).

In Picture Image Density field 16, Light Copy display section 16*a*, Automatic display section (with the character A) 16*b*, Dark Copy display section 16*c* (shown by diagonal shading) and 2 arrows are displayed.

Next, controller 220 displays Clear/Stop (C/S) field 17, which has a height of approximately 5 mm and a width of at least 5 mm, beneath Picture Image Density field 16 (ST9).

Also, controller 220 displays Print field 18, shown by a graphic of copy paper, beneath Message field 14 in the lower right-hand corner of flat display 800*b* (ST10). At the same time, it displays the Help (HELP) field 15 in the upper right-hand corner of Message field 14 (ST11).

At the same time as displaying the various fields for flat display 800*b*, controller 220 also transmits control signals to transparent touch panel 800*a* based on the control program. Controller 220 sets touch areas for the following: the areas for Copy Paper Size 10*b* and Number of Copies input keys 10*e* in Copy Specification field 10; the areas of Magnification input keys 11*c* of Magnification Mode field 11; the whole area of Photograph Mode field 12; the whole area of Edit Mode field 13; the whole of Help field 15; the areas of Light Copy display section 16*a*, Automatic display section 16*b* and Dark Copy display section 16*c* in Picture Image Density field 16; the whole area of Clear/Stop field 17 and the whole area of Print field 18.

Therefore, transparent touch panel 800*a* is designed not to exhibit any touch action if any sections other than the various areas described above are touched.

For example, an operator may input instructions to execute enlargement of an A4 size original document to an A4 size copy paper at 120% magnification and input to Number of Copies input keys 10*e* in this kind of Copy Mode.

Next, out of the copy modes described above, the 2nd Generation Edit Screen Mode and the 3rd Generation Edit Screen Mode for executing the editing of picture image information are explained with reference to FIGS. 5 to 8.

Figure 5:
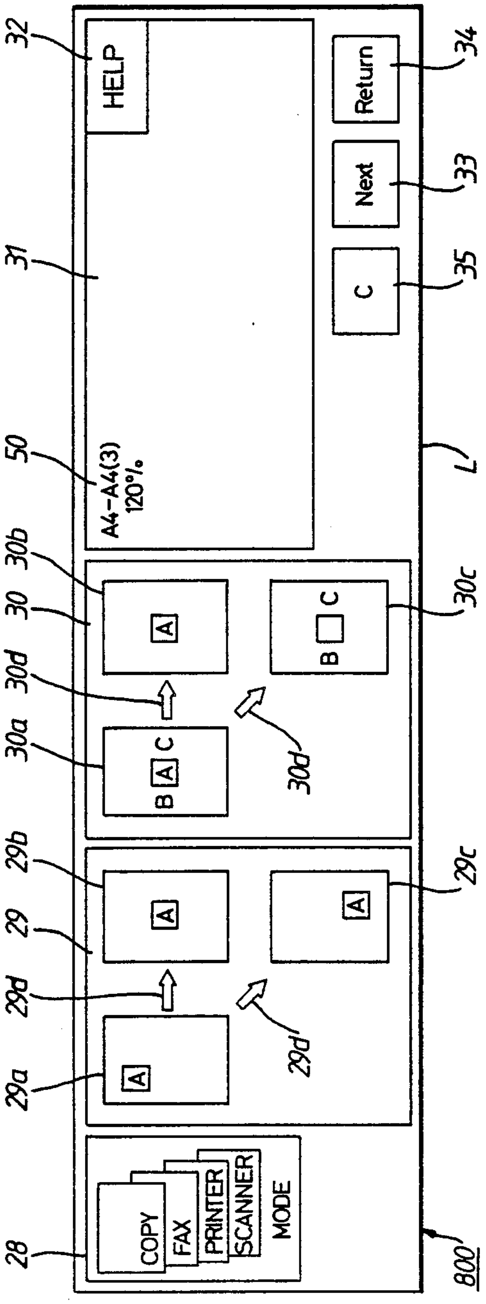
FIG. 5 is a plan view showing a 2nd Generation Edit Screen Mode after the Copy Mode shown in FIG. 3.
Figure 6:
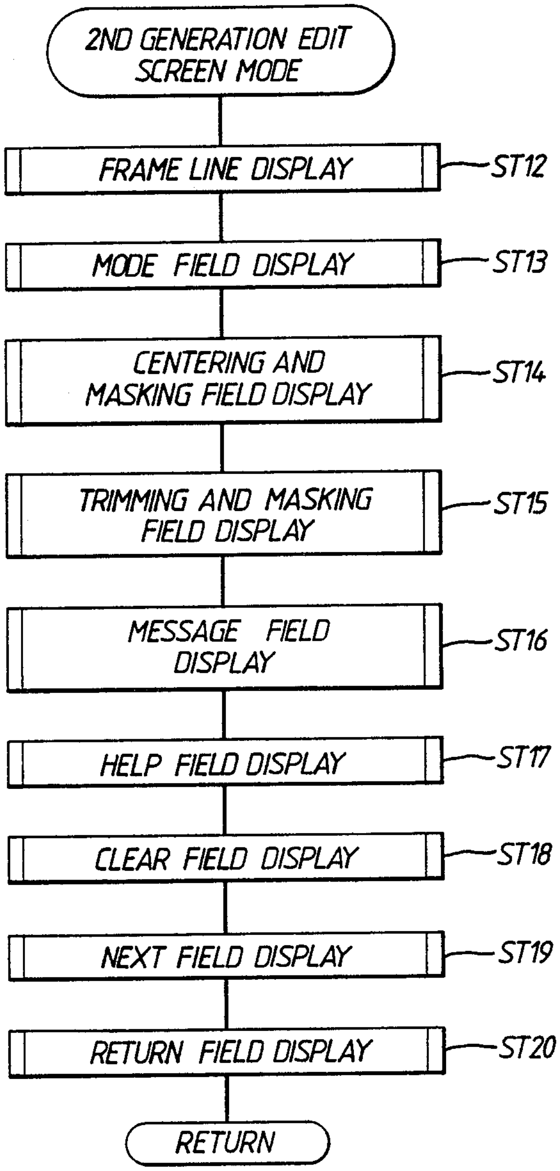
FIG. 6 is a flow chart showing the display content in the 2nd Generation Edit Screen Mode.

FIG. 5 shows the 2nd Generation Edit Screen Mode which is set by the single operation of Edit Mode field 13 in the Copy Mode shown in FIG. 3.

That is, when Edit Mode field 13 is operated once, controller 220 controls input sound generator 160 to generate an audible sound once and, at the same time, completely clears the Copy Mode shown in FIG. 3. Then controller 220 displays the frame line L shown in FIG. 5 on flat display 800*b* based on the control program shown in FIG. 6 (ST12). Next, controller 220 executes the display of Mode field 28 which is the same as Mode field 90 (ST13) and sets the touch area for this Mode field 28. Furthermore, controller 220 displays centering and Moving field 29 immediately to the right of Mode field 28 (ST14) and also executes the setting of touch areas in the required areas. Centering and Moving field 29 is composed of the following, displayed on flat display 800*b*: Original Document 29*a*, shown by edit mark [A] in the upper left corner; Centering display section 29*b*, shown by edit mark [A] in the center; Moving display section 29*c*, shown by edit mark [A] in the lower right corner, and arrows 29*d*.

At the same time, touch areas are set on transparent touch panel 800*a* in areas corresponding to Centering display section 29*b* and Moving display section 29*c*. Next, controller 220 displays Trimming and Masking field 30 immediately to the right of Centering and Moving field 29 (ST15) and sets touch areas in the required areas.

In this Trimming and Masking field 30, the following are displayed by flat display 800*b*: Original Document 30*a* in which the mark B[A]C is displayed in the center; Trimming display section 30*b* in which the mark [A] is shown in the center; Masking display section 30*c* in which the mark B[ ]C is shown in the center, and arrows signs 30*d*.

At the same time, touch areas are set in Trimming display section 30*b* and Masking display section 30*c*.

Next, controller 220 displays Message field 31 immediately to the right of Trimming and Masking field 30 (ST16) and also displays Help field 32 (ST17) together with setting the touch area for Help field 32.

Furthermore, controller 220 executes the display of Clear field 35, Next field 33 and Return field 34, in that order, underneath Message field 31 (ST18, ST19, ST20), and also executes the setting of the touch areas for these fields.

In message field 31 of the 2nd Generation Edit Screen Mode which has been set in this way, as shown in FIG. 5, at this time, the inputted operation information which is displayed as a pre-operational inputted information display 50, composed of the magnification information "A4→A4, 120%" and number of copies information "(3)" which were set in the display mode of the Copy Mode are displayed.

By this means, the operator of this device can execute various input operations in the 2nd Generation Edit Screen Mode while checking the inputted operation information the operator himself has already inputted.

Next, the 3rd Generation Edit Screen Mode is explained with reference to FIGS. 7 and 8.

When the operator touches Next field 33 once, in the 2nd Generation Edit Screen Mode state shown in FIG. 5, the 2nd Generation Edit Screen Mode is completely cleared under the control of controller 220.

Then, controller 220 displays the following items in order on flat display 800*b* (ST21 to ST30): frame line L; Mode field 35 similar to Mode field 28; Type of Edit and Setting Number display 36; Set Manual display field 37; Message field 38; Help field 39; Set field 40; Clear field 41; End field 42; Next field 43 and Return field 44.

The following items are displayed in the above type of Edit as Setting Number display field 36: Edit Original Document 36*a*; Type of Edit display section 36*b*; Input Setting Number section 36*c*, composed of the numbers 1 to 6; Output Setting Number section 36*d*, composed of the numbers 1 to 6, and arrow 36*e*.

Controller 220 displays Edit Original Document 36*a* in reverse (for instance, in white on a black ground) on the initial screen and, at the same time, causes the [1] part of Input Setting section 36*c* to light up. In this state, when there have been 2 input operations in Set field 40, Edit Original Document 36*a* is displayed in regular form (black on a white ground) and controller 220 executes the display control required for editing such as the reverse display of Type of Edit display section 36*b*.

Figure 7:
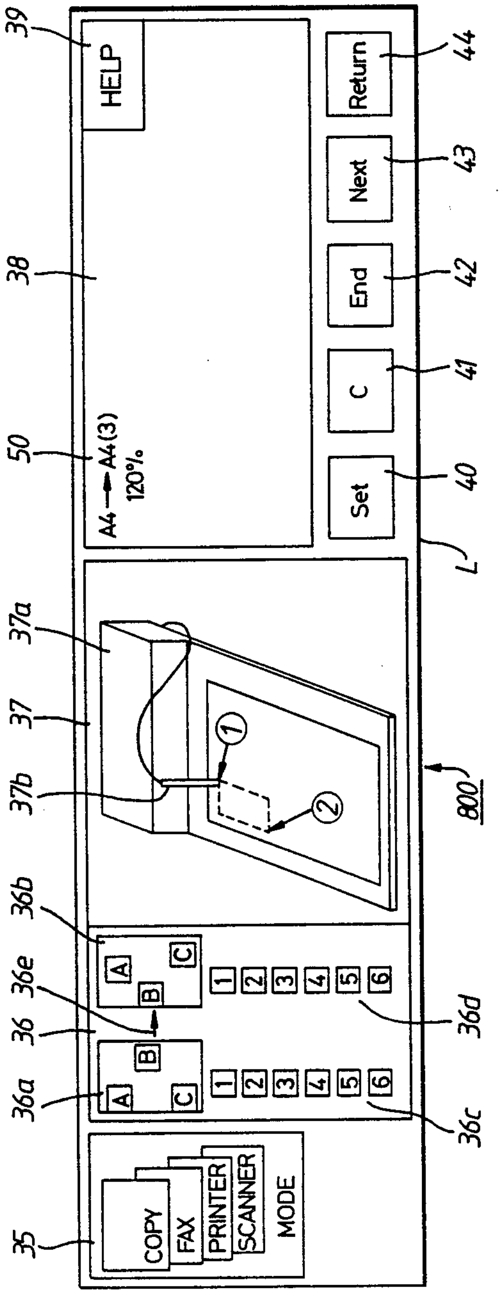
FIG. 7 is a plan view showing a 3rd Generation Edit Screen Mode after the Copy Mode shown in FIG. 3.
Figure 8:
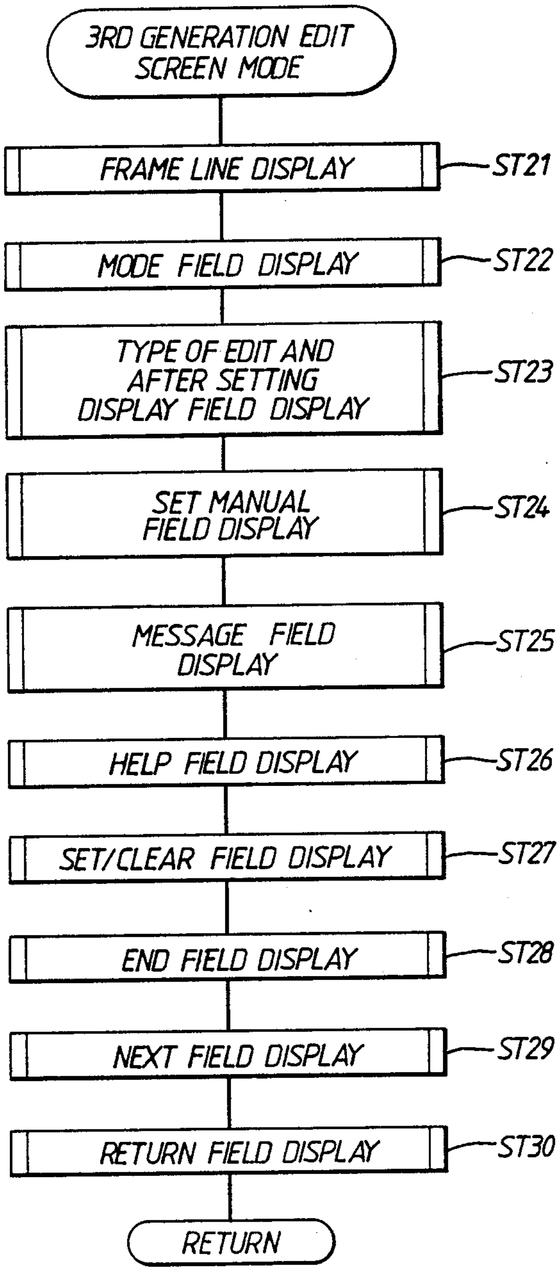
FIG. 8 is a flow chart showing the display cantent in the 3rd Generation Edit Screen Mode.

In Set Manual field 37, a Digitizer graphic is displayed, as shown in FIG. 7. When there is a reverse display of Edit Original Document 36*a*, controller 220 controls the display so that a Pen graphic 37*b* is shown at position (1) in Digitizer graphic 37*a* and, at the same time, when there is 1 input operation in Set field 40, it controls the display so that Pen graphic 37*b* is shown at position (2) in the Digitizer graphic.

In addition, in the case of the 3rd Generation Edit Screen Mode, controller 220 sets the respective touch areas in Mode field 35, Help field 39, Set field 40, Clear field 41, End field 42, Next field 43 and Reture field 44.

Moreover, in the case of the 3rd Generation Edit Screen Mode, since, at this time, the inputted operation information which is displayed as a pre-operational inputted information display 50, composed of the same magnification information "A4→A4, 120%" and the number of copies information "(3)" as in the 2nd Generation Edit Screen Mode shown in FIG. 5 are displayed in Message field 31, the operator can execute input operations while checking the inputted operation information.

Next, the case of carrying put facsimile transmission from combined equipment 100 is explained with reference to FIG. 9.

In this case, Mode field 90 is touched once with a finger. Then, controller 220 completely clears the display mode shown in FIG. 3 and, at the same tine as executing the display of frame line L for the Facsimile Mode shown in FIG. 9, controller 220 displays Mode field 56, in which the frame with the characters for facsimile (FAX) is uppermost, in the position of Mode field 90. At this time, a touch area is set for the whole area of Mode field 56 based on a similar control operation to those mentioned above.

Next, controller 220 executes the following, based on similar operations to the cases described above: the display of Transmission and Reception Switching field 57 and the setting of a touch area covering the while area of this field; the display of Original Document Density field 58 and the setting of touch areas for Dark display section 58*a*, Automatic display section 58*b* and Light display section 58*c*; the display of Photograph Mode field 59 and the setting of touch areas for Document 59*a*, Camera 59*b* and Camera Fine (FINE) 59*c* in this Photograph Mode field 59; the display of Dial field 60, which is composed of Telephone mark 60*a*, Telephone Number display section 60*b*, Short Dialling mark (*) 60*c* and ten-key 60*d*; the display of Timer Transmission field 61, composed of a Clock display, and the setting of the touch area for Timer Transmission field 61; the display of Password field 62 and the setting of a touch area for the whole area of Password field 62; the display of Polling Reception field 63 and the setting of a touch area for the whole area of this field; the display of Telephone Reservation field 64 and the setting of a touch area for the whole area of this field; the display of Message field 65; the display of Help (HELP) field 66 and the setting of a touch area for the whole area of this field in upper right corner of Message field 65; the display of Clear/Stop field 67 and the setting of a touch area for this field in the area below Message field 65 and the display of Facsimile field 68 and the setting of a touch area for this field.

Figure 9:
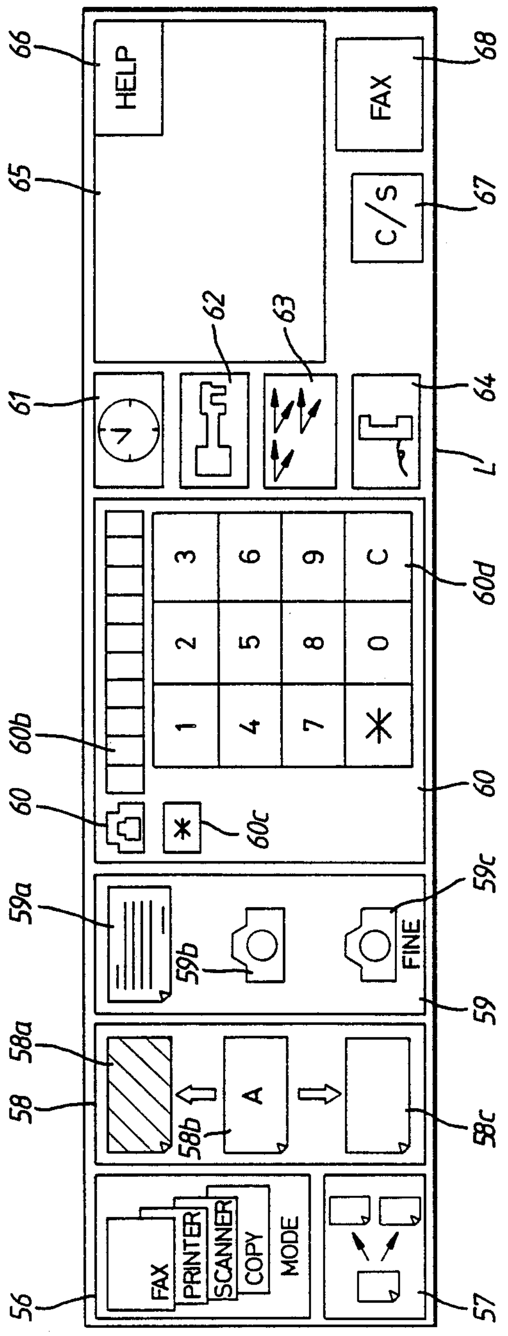
FIG. 9 is a plan view showing the Facsimile Transmission Mode in the first preferred embodiment.

In the case of this Facsimile Transmission Mode, since the functions are completely different from those of the Copy Mode described above, even if the operator switches to the Facsimile Transmission Mode immediately after executing the input for the Copy Mode, display control is executed by controller 220 so that the inputted operation information in the Copy Mode is not displayed in Message field 65 in the Facsimile Transmission Mode shown in FIG. 9.

Moreover, when the operator operates the various touch areas in each of the operation modes described above, since an audible sound is generated from input sound generator unit 160 on each occasion, based on the control of controller 220, the operator can also check the state of the input operations he has performed by his sense of hearing.

This invention is not limited to the embodiment described above, and various types of modification are possible within the limits of the essential points.

For example, in the embodiment described above, the case of displaying inputted operation information for the display mode which is the bases of the Copy Mode in the displays of the 2nd Generation Edit Screen Mode and the 3rd Generation Edit Screen Mode is explained. However, this invention is not limited to this and, needless to say, the inputted operation information in the 2nd generation screen or 3rd generation screen in the respective modes in the case of the Facsimile Transmission and Reception Modes, the Printer Mode and the Scanner Mode can also be exhibited.

When using this invention as described in detail above, despite changes in the display mode, the operation information inputted prior to the change can be displayed in the display mode after the change. Therefore, it is possible to provide a combined display and input device which can be more effectively used, since it is easy to check the inputted operation information.

What is claimed is:

1. A display and input device incorporating a plurality of equipment having independent functions, comprising:

a memory including a memory portion defining the appearance of a plurality of operation modes;

a display unit for displaying a picture image of ones of the plurality of operation modes according to said plurality of equipment having independent functions, said display unit having a plurality of display modes that vary according to input operations of said equipment and, when a display mode has been changed to a new display mode, the operation information inputted prior to the change in the display mode is simultaneously displayed by said display unit during the new display mode;

an input unit having a plane surface and superimposed over the display unit, said input unit for generating electrical signals corresponding to x- and y- coordinates of any portion of said display unit which is touched, the surface input area portions corresponding to one of said picture images of an operation mode; and a controller for loading the control programs from an instruction listing stored in the memory, for setting said input areas of said input unit for various modes, for receiving said electrical signals of the input unit at the same time and for executing the various displays of said display unit.

2. A display and input device according to claim 1, wherein said display unit is a flat display and said input unit is a transparent touch panel.

3. A display and input device according to claim 1, wherein said device is used in a combined equipment which incorporates at least two combined functions which are selected from the group of copier, facsimile machine, printer and scanner.

4. A display and input device according to claim 1, wherein said combined equipment includes a copier having a copy mode including a copied image size changing function and a plural copies function, and wherein said operation information inputted prior to a display mode change and displayed during the new display mode is magnification information for the copied image size changing function and a number of copies information for the plural copies function.

* * * * *